(12) United States Patent
Potocki

(10) Patent No.: US 11,084,087 B2
(45) Date of Patent: Aug. 10, 2021

(54) SURFACE DESIGN FOR SELF PIERCING RIVET BUTTON FORMATION

(71) Applicant: MAGNA INTERNATIONAL INC., Aurora (CA)

(72) Inventor: John Richard Potocki, Armada, MI (US)

(73) Assignee: MAGNA INTERNATiONAL INC., Ontario (CA)

( * ) Notice: Subject to any disclaimer, the term of this patent is extended or adjusted under 35 U.S.C. 154(b) by 0 days.

(21) Appl. No.: 15/747,944

(22) PCT Filed: Aug. 12, 2016

(86) PCT No.: PCT/US2016/046795
§ 371 (c)(1),
(2) Date: Jan. 26, 2018

(87) PCT Pub. No.: WO2017/030969
PCT Pub. Date: Feb. 23, 2017

(65) Prior Publication Data
US 2018/0214933 A1 Aug. 2, 2018

Related U.S. Application Data

(60) Provisional application No. 62/205,302, filed on Aug. 14, 2015.

(51) Int. Cl.
*F16B 5/04* (2006.01)
*B21J 15/02* (2006.01)
(Continued)

(52) U.S. Cl.
CPC .............. *B21J 15/025* (2013.01); *F16B 5/04* (2013.01); *F16B 19/086* (2013.01); *B32B 3/00* (2013.01)

(58) Field of Classification Search
CPC ..... Y10T 428/24008; Y10T 428/24017; Y10T 428/24339; Y10T 29/49956;
(Continued)

(56) References Cited

U.S. PATENT DOCUMENTS

| 5,752,305 A | 5/1998 | Cotterill et al. |
| 6,842,962 B1 | 1/2005 | Blacket |

(Continued)

OTHER PUBLICATIONS

Written Opinion of the International Searching Authority PCT/US2016/046795 dated Oct. 28, 2016.
(Continued)

*Primary Examiner* — Alexander S Thomas
(74) *Attorney, Agent, or Firm* — Pillsbury Winthrop Shaw Pittman LLP

(57) ABSTRACT

A riveted assembly includes a first panel member having a first surface and a second surface opposite to the first surface; a second panel member having a first surface and a second surface opposite to the first surface; and a rivet. The first and second panel members are positioned such that at least a portion of the second surface of the first panel member is in contact with at least a portion of the first surface of the second panel member. The rivet extends into and engages the first surface of the first panel member, and has an outwardly flared portion about which a portion of the first panel member and the second panel member are deformed, such that the rivet mechanically connects the first panel member to the second panel member at a connection region. The second surface of the second panel member has a differential height surface portion at least at the connection region.

16 Claims, 7 Drawing Sheets

(51) Int. Cl.
*F16B 19/08* (2006.01)
*B32B 3/00* (2006.01)

(58) Field of Classification Search
CPC .. Y10T 29/49837; F16B 19/086; F16B 19/04; F16B 19/06; B21J 15/025
See application file for complete search history.

(56) References Cited

U.S. PATENT DOCUMENTS

| | | | |
|---|---|---|---|
| 2006/0016056 A1* | 1/2006 | Kato | B21J 15/025 |
| | | | 29/34 B |
| 2010/0287752 A1 | 11/2010 | Wojciechowski | |
| 2013/0273314 A1 | 10/2013 | Campbell et al. | |
| 2015/0167710 A1* | 6/2015 | Scott | B32B 7/08 |
| | | | 403/282 |

OTHER PUBLICATIONS

International Search Report PCT/US2016/046795 dated Oct. 28, 2016.
International Preliminary Report on Patentability PCT/US2016/046795 dated Feb. 20, 2018.

* cited by examiner

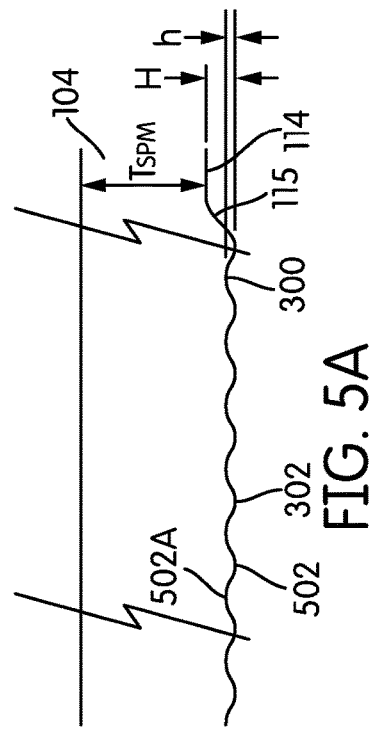
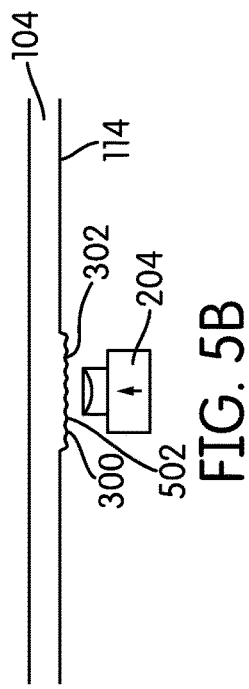
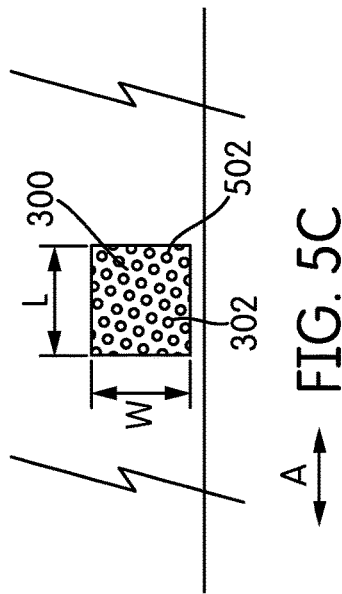
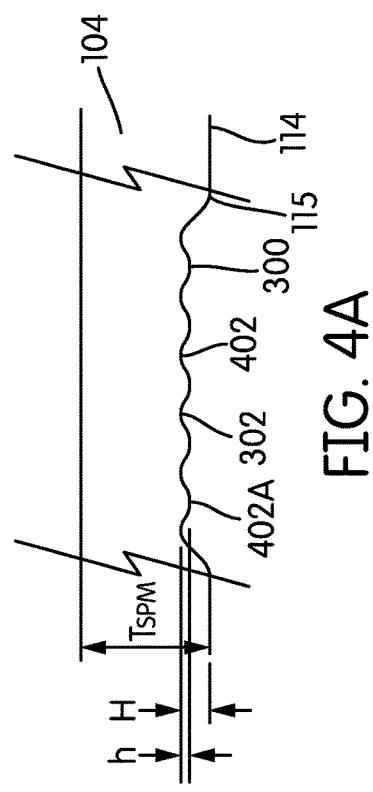
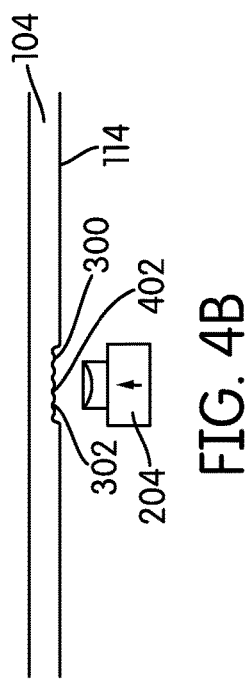
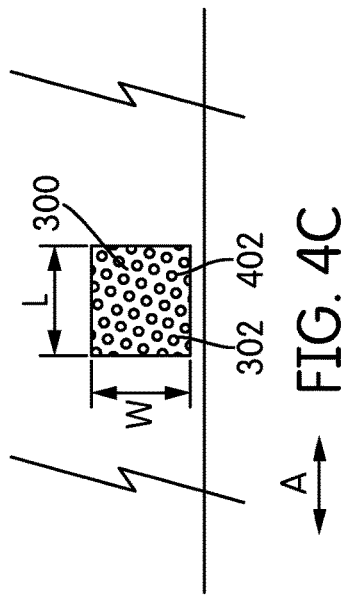

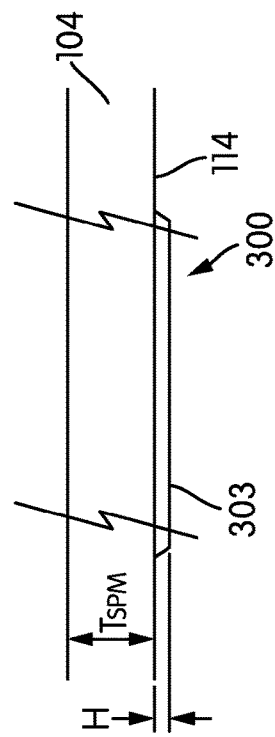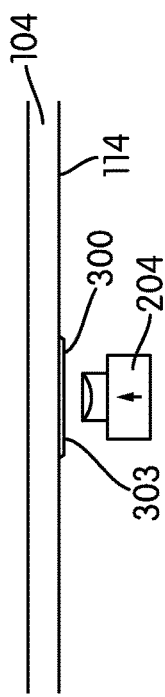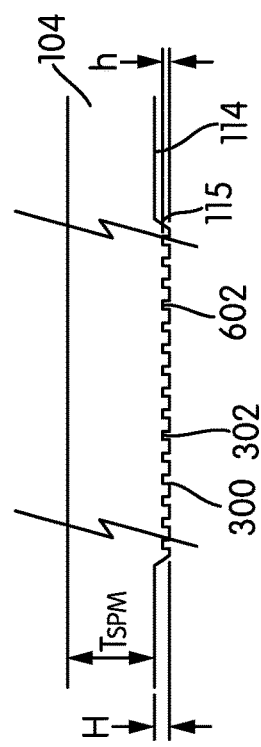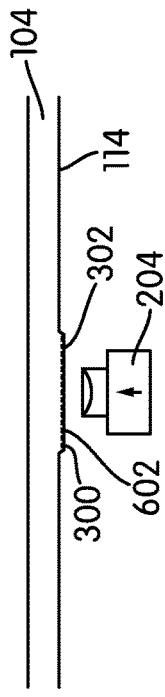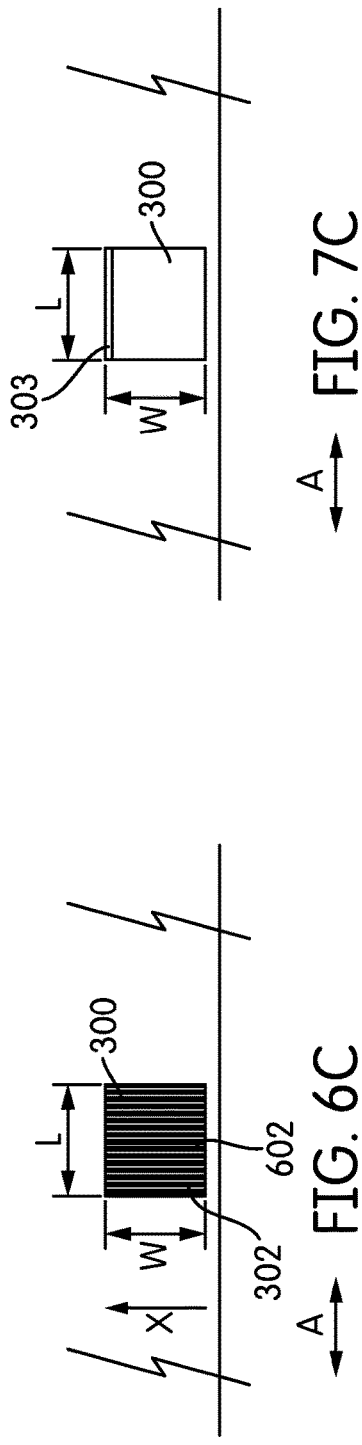

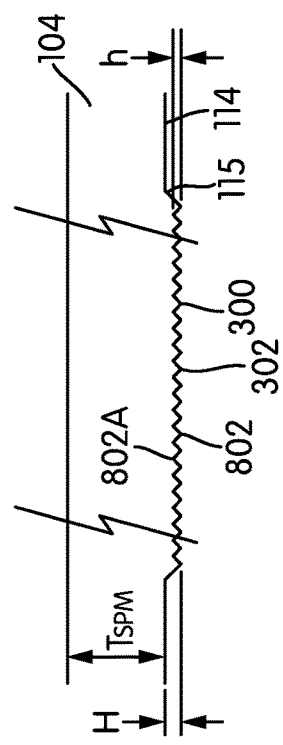 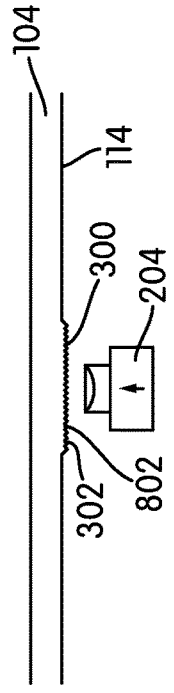 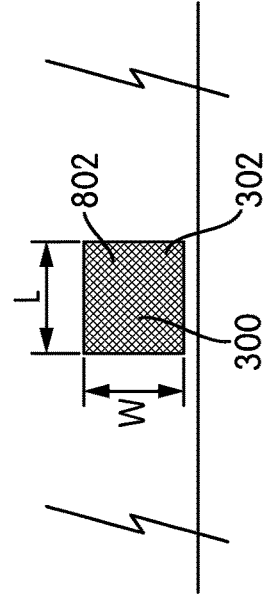
FIG. 8A  FIG. 8B  FIG. 8C
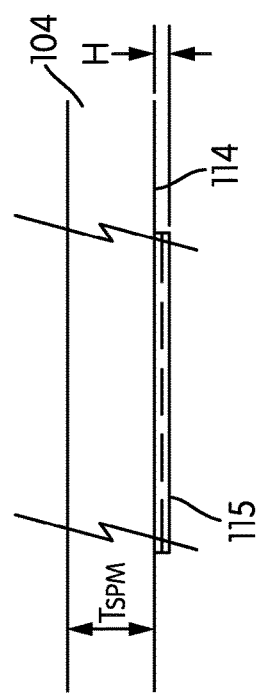 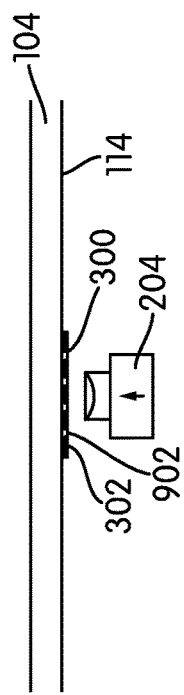 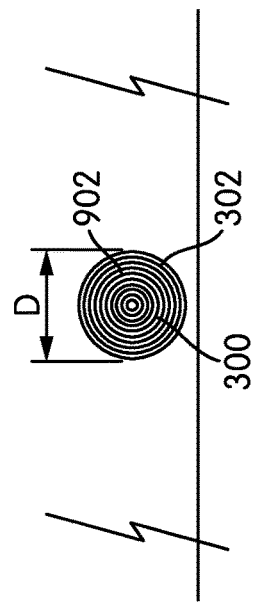
FIG. 9A  FIG. 9B  FIG. 9C

SURFACE DESIGN FOR SELF PIERCING RIVET BUTTON FORMATION

CROSS-REFERENCE TO RELATED APPLICATION APPLICATIONS

This patent application is the U.S. National Phase of PCT/US2016/046795, filed Aug. 12, 2016, which claims priority to provisional patent application No. 62/205,302 filed on Aug. 14, 2015. The subject matter of each is incorporated herein by reference in entirety.

FIELD

The present patent application relates to riveted assemblies.

BACKGROUND

Self-pierce riveting is used in the automotive industry to join or fasten panel members. The self-pierce riveting is a cold joining procedure and does not require pre-drilled or punched hole(s). During the self-pierce riveting, self-piercing rivets are configured to be pushed directly into body, panel or sheet members clamped together between a punch (or a blank holder) and a die in a punch and die assembly (e.g., a press tool). The self-piercing rivet generally includes a head end and an opposing, formed button end.

High Pressure Die Cast (H.D.P.C.) aluminum members have low elongation properties, resulting in radial cracking on the surface of the aluminum member at the location of the self-piercing rivet "button" formation. This radial cracking may lead to water intrusion and corrosion.

During the manufacturing procedure, the high pressure die cast members are generally heat treated to increase the elongation properties of the cast members, and to prevent micro cracking in the cast members and the subsequent corrosion of the cast members on the "button" side/end of the self-piercing rivet.

For high pressure die cast aluminum members, various oven or solution heat treatment methods are used on the completed/formed/assembled members. For example, the high pressure die cast aluminum members are loaded into baskets, racks or into conveyors. The high pressure die cast aluminum members are then slowly heated until the prescribed temperature and time are reached. Heat treating the entire cast member may generally require large and expensive heat treating systems. These heat treating systems may use large amounts of floor space (e.g., material handling, racking, etc.), and may use large amounts of energy. The heat treatment methods may be inherently slow and may also tend to induce distortion into the cast members which requires expensive straightening procedures to bring the cast members back to a desired specification.

The present patent application provides improvements to the riveted assemblies.

SUMMARY

One aspect of the present patent application provides a riveted assembly that includes a first panel member, a second panel member, and a rivet. The first panel member has a first surface and a second surface opposite to the first surface. The second panel member has a first surface and a second surface opposite to the first surface. The first and second panel members are positioned such that at least a portion of the second surface of the first panel member is in contact with at least a portion of the first surface of the second panel member. The rivet extends into and engages the first surface of the first panel member, and has an outwardly flared portion about which a portion of the first panel member and the second panel member are deformed, such that the rivet mechanically connects the first panel member to the second panel member at a connection region. The second surface of the second panel member has a differential height surface portion at least at the connection region.

While the present patent application can be used for assembling automobile or vehicle body or panel members, the same system and method can be used to assemble or fasten sheet steel, aluminum or plastic members that can be used for other applications, for example but not limited to the aerospace industry, the machine construction industry, the air conditioning (HVAC) industry, the building or framing industry, etc.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclose, by way of example only, with reference to the accompanying schematic drawings in which corresponding reference symbols indicate corresponding parts, in which

FIGS. 4A-4C illustrate internal dimple surface elements formed on a second surface of a second panel member of the riveted assembly in accordance with an embodiment of the present patent application, where FIG. 4A illustrates an enlarged front elevational view of the second panel member at a connection region of the assembly; FIG. 4B illustrates a front elevational view of the second panel member being positioned on the die of the punch and die system; and FIG. 4C illustrates an enlarged top elevational view of the second surface of the second panel member at the connection region of the assembly with the internal dimple surface elements formed thereon, and where portions of the assembly are not shown in FIGS. 4A-4C for sake of clarity;

FIGS. 5A-5C illustrate external dimple surface elements formed on the second surface of the second panel member of the riveted assembly in accordance with another embodiment of the present patent application, where FIG. 5A illustrates an enlarged front elevational view of the second panel member at the connection region of the assembly; FIG. 5B illustrates a front elevational view of the second panel member being positioned on the die of the punch and die system; and FIG. 5C illustrates an enlarged top elevational view of the second surface of the second panel member at the connection region of the assembly with the external dimple surface elements formed thereon, and where portions of the assembly are not shown in FIGS. 5A-5C for sake of clarity;

FIGS. 6A-6C illustrate linear ridge surface elements formed on the second surface of the second panel member of the riveted assembly in accordance with another embodiment of the present patent application, where FIG. 6A illustrates an enlarged front elevational view of the second panel member at the connection region of the assembly; FIG. 6B illustrates a front elevational view of the second panel member being positioned on the die of the punch and die system; and FIG. 6C illustrates an enlarged top elevational view of the second surface of the second panel member at the connection region of the assembly with the linear ridge surface elements formed thereon, and where portions of the assembly are not shown in FIGS. 6A-6C for sake of clarity;

FIGS. 7A-7C illustrate extended flat depth surface elements formed on the second surface of the second panel member of the riveted assembly in accordance with another embodiment of the present patent application, where FIG. 7A illustrates an enlarged front elevational view of the second panel member at the connection region of the assembly; FIG. 7B illustrates a front elevational view of the second panel member being positioned on the die of the punch and die system; and FIG. 7C illustrates an enlarged top elevational view of the second surface of the second panel member at the connection region of the assembly with the extended flat depth surface elements formed thereon, and where portions of the assembly are not shown in FIGS. 7A-7C for sake of clarity;

FIGS. 8A-8C illustrate knurled surface elements formed on the second surface of the second panel member of the riveted assembly in accordance with another embodiment of the present patent application, where FIG. 8A illustrates an enlarged front elevational view of the second panel member at the connection region of the assembly; FIG. 8B illustrates a front elevational view of the second panel member being positioned on the die of the punch and die system; and FIG. 8C illustrates an enlarged top elevational view of the second surface of the second panel member at the connection region of the assembly with the knurled surface elements formed thereon, and where portions of the assembly are not shown in FIGS. 8A-8C for sake of clarity; and FIGS. 9A-9C illustrate raised concentric ring elements formed on the second surface of the second panel member of the riveted assembly in accordance with another embodiment of the present patent application, where FIG. 9A illustrates an enlarged front elevational view of the second panel member at the connection region of the assembly; FIG. 9B illustrates a front elevational view of the second panel member being positioned on the die of the punch and die system; and FIG. 9C illustrates an enlarged top elevational view of the second surface of the second panel member at the connection region of the assembly with the raised concentric ring elements formed thereon, and where portions of the assembly are not shown in FIGS. 9A-9C for sake of clarity.

DETAILED DESCRIPTION

Figure 1:
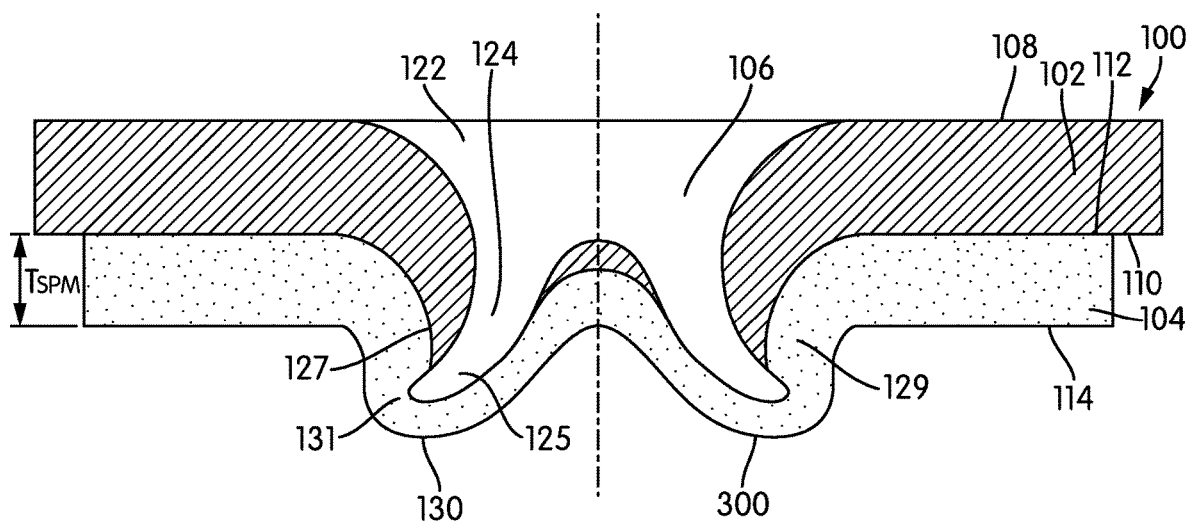
FIG. 1 illustrates a riveted assembly that includes two or more panel members assembled using a self-piercing rivet in accordance with an embodiment of the present patent application.

Referring to FIG. 1, in one embodiment, the present patent application discloses a riveted assembly 100 that includes a first panel member 102, a second panel member 104, and a rivet 106. The first panel member 102 has a first surface 108 and a second surface 110 opposite to the first surface 108. The second panel member 104 has a first surface 112 and a second surface 114 opposite to the first surface 112. The first and second panel members 102 and 104 are positioned such that at least a portion of the second surface 110 of the first panel member 102 is in contact with at least a portion of the first surface 112 of the second panel member 104. The rivet 106 extends into and engages the first surface 108 of the first panel member 102, and has an outwardly flared portion 125 about which a portion of the first panel member 102 and the second panel member 104 are deformed, such that the rivet 106 mechanically connects the first panel member 102 to the second panel member 104 at a connection region 129. The second surface 114 of the second panel member 104 has a differential height surface portion 300 at least at the connection region 129.

In one embodiment, the assembly 100 may include panel members being made of similar material. In another embodiment, the assembly 100 may include panel members being made of dissimilar materials (e.g., steel to aluminum, or non-metallic to metallic materials). In one embodiment, the assembly 100 may include panel members having same thickness. In one embodiment, the assembly 100 may include panel members having varying thicknesses. In one embodiment, the assembly 100 with the first and second panel members 102 and 104 may have a total thickness in the range between 3 mm and 9 mm. In another embodiment, the assembly 100 may have a total thickness of 9 mm. In yet another embodiment, the assembly 100 may have a total thickness of 8 mm.

In one embodiment, the first panel member 102 may be referred to as the top layer or top member of the assembly 100 and the second panel member 104 may be referred to as the bottom layer or bottom member of the assembly 100. In another embodiment, the second panel member 104 may also be referred to as the tail side of the riveted joint.

In one embodiment, the "panel member" may generally be a piece of material. In one embodiment, the first panel member 102 is a vehicle body/sheet/panel member or a vehicle body casting. In one embodiment, the first panel member 102 may be formed from a metal material. For example, the metal material may include steel, stainless steel, hi-strength steel, Dual-phase steel sheet (e.g., DP600), aluminum, aluminum sheet, aluminum castings, coated steel (e.g., galvanized steel), uncoated steel (e.g., bare steel), coated aluminum (e.g., galvanized aluminum), uncoated aluminum (e.g., bare aluminum), steel alloys, boron steel, hot stamped steel, and/or aluminum alloys. In one embodiment, the first panel member 102 may be formed from a non-metallic material, such as a plastic material. In one embodiment, the first surface 108 of the first panel member 102 may be referred to as the top surface of the first panel member 102 and the second surface 110 of the first panel member 102 may be referred to as the bottom surface of the first panel member 102.

In one embodiment, the second panel member 104 is a vehicle body/sheet/panel member or a vehicle body casting. In one embodiment, the second panel member 104 may be formed from a metal material. For example, the metal material may include steel, stainless steel, hi-strength steel, Dual-phase steel sheet (e.g., DP600), aluminum, aluminum sheet, aluminum castings, coated steel (e.g., galvanized steel), uncoated steel (e.g., bare steel), coated aluminum (e.g., galvanized aluminum), uncoated aluminum (e.g., bare aluminum), steel alloys, boron steel, hot stamped steel, and/or aluminum alloys. In one embodiment, the second panel member 104 may be made from any ductile material conducive to a riveting procedure. In one embodiment, the first surface 112 of the second panel member 104 may be referred to as the top surface of the second panel member 104 and the second surface 114 of the second panel member 104 may be referred to as the bottom surface of the second panel member 104.

In one embodiment, referring to FIG. 1, the second panel member 104 may have a thickness, $T_{SPM}$ that generally ranges between 2 and 4 millimeters (mm). In another embodiment, the thickness, $T_{SPM}$ of the second panel member 104 may generally be in the range between 1.9 and 4.2 mm. In another embodiment, the thickness, $T_{SPM}$ of the second panel member 104 may generally be in the range between 1.8 and 4.2 mm. In yet another embodiment, the thickness, $T_{SPM}$ of the second panel member 104 may generally be in the range between 1.6 and 4.8 mm.

In one embodiment, the rivet 106 is a self-piercing rivet. The rivet 106 may be formed from a metal material. For example, the metal material may include steel, aluminum, steel alloys, and/or aluminum alloys. In one embodiment, the self-piercing rivet 106 may be heat-treated to increase their piercing capabilities.

In one embodiment, the rivet 106 may be used to secure two vehicle body members 102 and 104 to form the vehicle body assembly 100. The body assembly 100 can be any vehicle body part such as a body panel, an engine cradle, a control arm, a transverse axle, a sheet metal sub-assembly, a dash panel, a rail, an underbody structure, a bumper beam, a hood, a door, a trunk lid, a tailgate, a seat rail, a side-impact bar, a space frame, a window frame, a sunroof frame, etc. It should be noted, however, that the present patent application is not limited to vehicle components and can be applied to any parts or members that are riveted to form a riveted assembly.

In one embodiment, the rivet 106 may include a head portion 122 and a leg portion 124 extending from the head portion 122. In one embodiment, the leg portion 124 includes a hollow, cylindrical cross-sectional configuration. In one embodiment, diameter of the head portion 122 is larger than the diameter of the leg portion 124.

Figure 2:
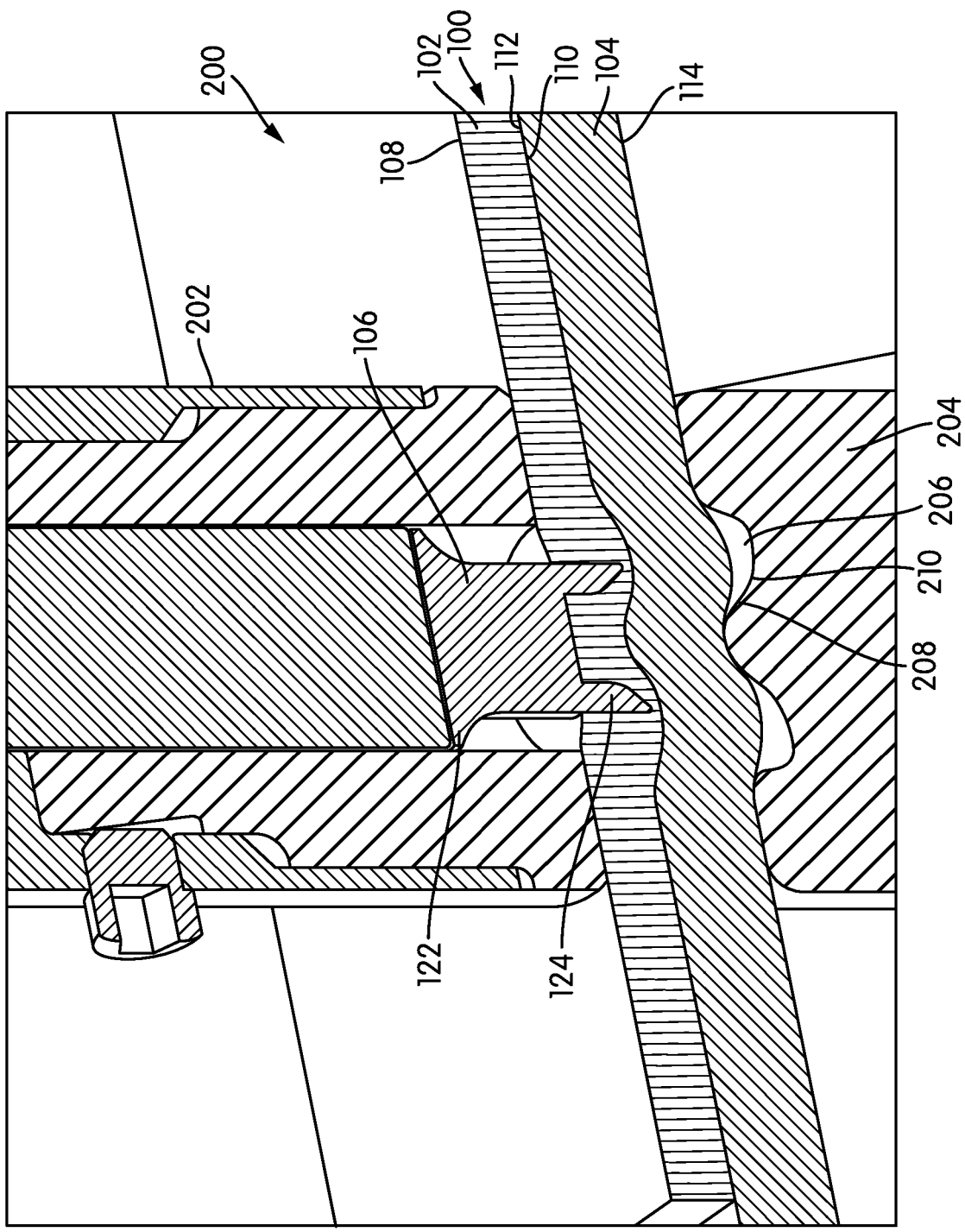
FIG. 2 illustrates a cross-sectional view of a punch and die system in which a self-piercing rivet is being driven by a punch of the punch and die system into portions of the two or more panel members in accordance with an embodiment of the present patent application.

FIG. 2 shows a system 200 for assembling two or more panel members 102 and 104 using the rivet 106 to form the vehicle body assembly 100. FIGS. 3A-3F show procedures of a method for joining or assembling two or more panel members 102 and 104 using the self-piercing rivet 106 to form the vehicle body assembly 100.

In one embodiment, the system 200 may be a punch and die system. In one embodiment, the system 200 may be a press tool. In one embodiment, the system 200 may include a robotically controlled self-piercing riveting tool or punch that is manipulated by a robotic arm.

In one embodiment, the system 200 may include a punch 202 and a die 204. In one embodiment, the rivet 106 is configured to be driven by the punch 202 of the punch and die system 200 into portions of vehicle body or panel members 102 and 104.

In one embodiment, the punch 202 of the system 200 may be a movable (up and down movement) top member. In one embodiment, the punch 202 of the system 200 may be pneumatically or hydraulically powered to drive the rivet 106 into the stacked panel members 102 and 104. In one embodiment, the punch 202 of the system 200 may be configured such that the rivet 106 is driven into the stacked panel members 102 and 104 with a predetermined force and/or at a predetermined speed. In one embodiment, the predetermined force and/or at a predetermined speed may depend on the material and/or thicknesses of the stacked panel members 102 and 104.

In one embodiment, the system 200 may be operatively connected to a programmable logic controller (PLC). The controller may be configured to monitor and control the amount of force and/or speed of the punch 202 during the riveting procedure. In one embodiment, the controller or control mechanism 30 is configured to receive a user input and based on the user input automatically control the punch 202 of the system 200.

In one embodiment, the die 204 of the punch and die system 200 may be a stationary bottom die. In one embodiment, the die 204 has a cavity 206 configured to receive portions of the panel members 102 and 104 deformed (towards the die 204) by the rivet 106. In one embodiment, the cavity 206 may include a protrusion or a raised portion 208 disposed centrally on a bottom surface 210 of the cavity 206. In other embodiment, the cavity 206 may include other shaped configurations that are configured to receive portions of the panel members 102 and 104 deformed (towards the die 204) by the rivet 106.

Figure 3A:
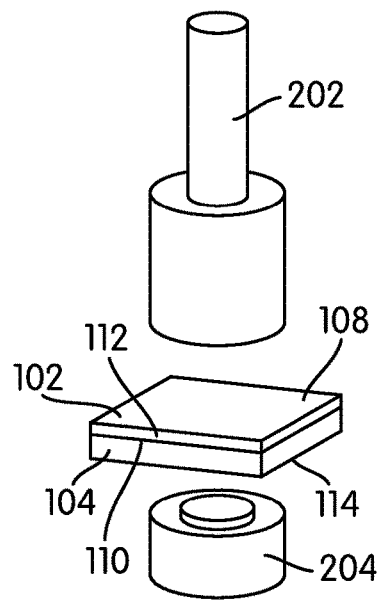
FIGS. 3A-3F illustrate a method for joining or assembling the two or more panel members using the self-piercing rivet in accordance with an embodiment of the present patent application.

Referring to FIG. 3A, the first and second panel members 102 and 104 are positioned such that at least a portion of the second surface 110 of the first panel member 102 is in contact with at least a portion of the first surface 112 of the second member 104.

Figure 3B:
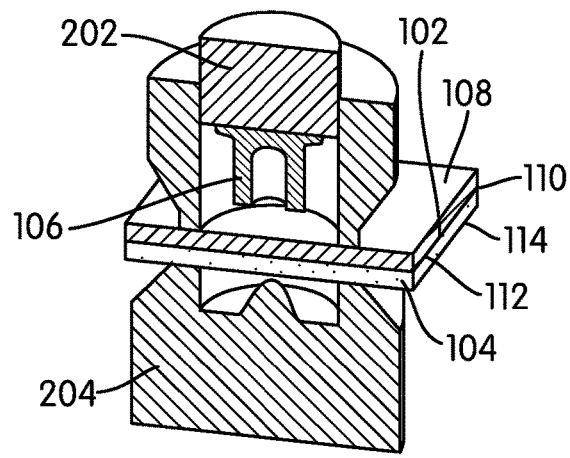

As shown in FIG. 3B, the stacked panel members 102 and 104 are then clamped between the punch 202 and the die 204 of the system 200. In one embodiment, the second panel member 104 of the stacked panel members is positioned on the die 204 such that the second surface 114 of the second panel member 104 faces the die cavity 206 of the die member 204.

Figure 3C:
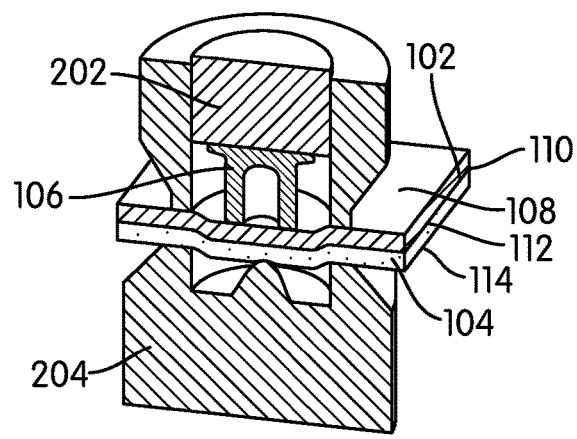

The punch 202 is configured to drive the rivet 106 into the stacked panel members 102 and 104. The rivet 106 is configured to first engage the first surface 108 of the first panel member 102 as shown in FIG. 3C.

The rivet 106 is driven (by the punch) to penetrate into the first panel member 102 (or the top panel member). As the punch 202 continues to drive the rivet 106 into the assembly 100, the rivet 106 is configured to flare into the bottom or second panel member 104 of the assembly 100. That is, the panel member 104 is stretched or extruded into the cavity 206 of the die 204. As the bottom or second panel member 104 is stretched or extruded into the die 204, the leg portion of the rivet 106 is flared outwardly on the die 204, securing the panel members 102 and 104 together. In one embodiment, the connection region 129 refers to a region of the assembly 100 at which the rivet 106 mechanically connects the panel member 102 to the panel member 104.

Figure 3D:
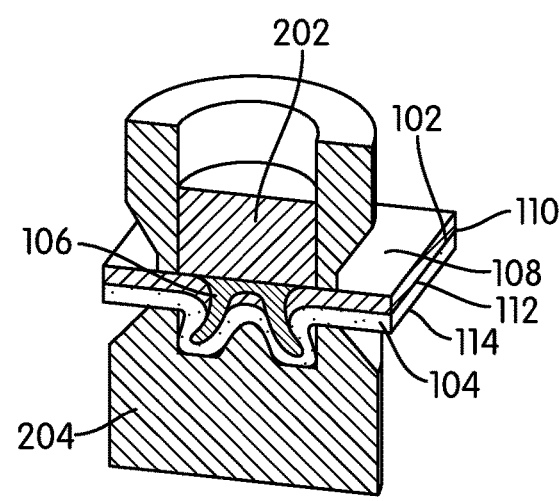
Figure 3E:
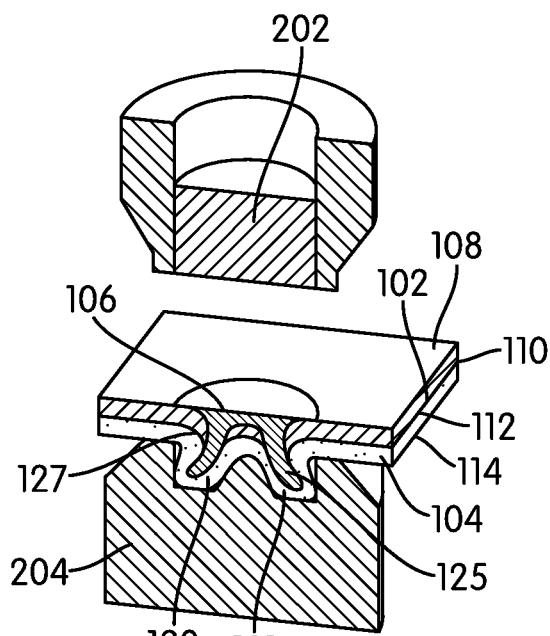

In one embodiment, as shown in FIGS. 3D and 3E, the shape and configuration of the cavity 206 of the die 204 is configured to cause the rivet 106 to flare outwardly within the bottom or second panel member 104 of the assembly 100 to form a mechanical interlock. The shape and configuration of the cavity 206 of the die 204 is also configured to cause a button 130 to form on the second surface 114 of the bottom or second panel member 104 of the assembly 100.

Figure 3F:
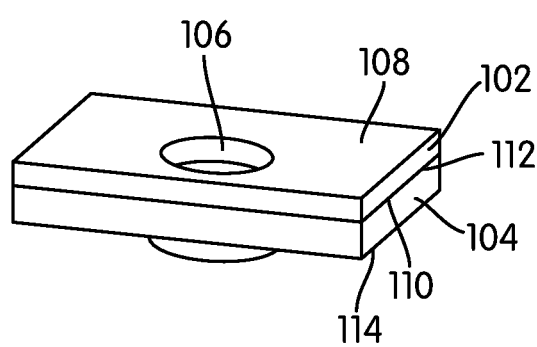

The rivet 106 has an outwardly flared portion 125 about which portions 127 and 131 of the first panel member 102 and the second panel member 104, respectively are deformed, such that the rivet 106 mechanically connects the first panel member 102 to the second panel member 104 at the connection region 129. FIG. 3F shows the assembly 100 in which the first and second panel members 102 and 104 are joined by the rivet 106.

In one embodiment, the second surface 114 of the second panel member 104 has the differential height surface portion 300 at least at the connection region 129. The differential height surface portion 300 includes one or more raised surface elements 302 that extend above a base surface height of the second surface 114 of the second panel member 104.

In one embodiment, the one or more raised surface elements 302 are at least 0.2 millimeters higher than the base surface height of the second surface 114 of the second panel member 104. In one embodiment, referring to FIGS. 4A, 5A, 6A, 7A, 8A and 9A, the one or more raised surface elements 302 may generally have a height dimension, H. In one embodiment, the height dimension, H of the one or more raised surface elements 302 is measured from the base surface height of the second surface 114 of the second panel member 104.

In one embodiment, the height dimension, H of the one or more raised surface elements 302 may generally range between 0.2 and 1.25 mm. In another embodiment, the height dimension, H of the one or more raised surface elements 302 may generally range between 0.19 and 1.31 mm. In yet another embodiment, the height dimension, H of the one or more raised surface elements 302 may generally range between 0.18 and 1.38 mm. In yet another embodiment, the height dimension, H of the one or more raised surface elements 302 may generally range between 0.16 and 1.5 mm.

In one embodiment, referring to FIGS. 4C, 5C, 6C, 7C, and 8C, the differential height surface portion 300 may have a width dimension, W that generally ranges between 10 and 20 mm. In another embodiment, the width dimension, W of the differential height surface portion 300 may generally range between 9.5 and 21 mm. In another embodiment, the width dimension, W of the differential height surface portion 300 may generally range between 9 and 22 mm. In yet another embodiment, the width dimension, W of the differential height surface portion 300 may generally range between 8 and 24 mm.

In one embodiment, referring to FIGS. 4C, 5C, 6C, 7C, and 8C, the differential height surface portion 300 may have a length dimension, L that generally ranges between 10 and 20 mm. In another embodiment, the length dimension, L of the differential height surface portion 300 may generally range between 9.5 and 21 mm. In another embodiment, the length dimension, L of the differential height surface portion 300 may generally range between 9 and 22 mm. In yet another embodiment, the length dimension, L of the differential height surface portion 300 may generally range between 8 and 24 mm.

In one embodiment, referring to FIG. 9C, the differential height surface portion 300 may have a diameter, D that generally ranges between 10 and 20 mm. In another embodiment, the diameter, D of the differential height surface portion 300 may generally range between 9.5 and 21 mm. In another embodiment, the diameter, D of the differential height surface portion 300 may generally range between 9 and 22 mm. In yet another embodiment, the diameter, D of the differential height surface portion 300 may generally range between 8 and 24 mm.

In one embodiment, the differential height surface portion 300 may generally be contiguous along the fastening flange of the riveted assembly. That is, the differential height surface portion 300 may extend (on both directions) along the arrow A (as shown in FIGS. 4C, 5C, 6C, 7C, and 8C). In another embodiment, the differential height surface portion 300 may generally be in a localized area (with a predetermined length dimension, L) of the riveted assembly.

In one embodiment, the differential height surface portion 300 may include embossed, textured, roughened, raised or profiled surface elements 302. In one embodiment, the differential height surface portion 300 may include a pattern or an arrangement of surface elements (e.g., protrusions and recesses) as will be described in detail in the embodiments below. In another embodiment, the differential height surface portion 300 may include spatially varying physical characteristics or features.

In one embodiment, the shape of the second surface 114 of the second panel member or casting 104 of the assembly 100 is altered from a flat surface to a patterned or textured surface in order to allow for the formation of the self-piercing rivet button area 130 without radial cracking or with some radial cracking that is within the acceptable limits for the structural integrity desired for the specific application or assembly being riveted. In one embodiment, this is accomplished by altering the surface contour of the surface 114 at the connection region 129 (or at the site of the self-piercing rivet 106) in order to "feed" material into the self-piercing rivet button area 130, thus, relieving surface tension. That is, the surface contour of the surface 114 at the connection region 129 is altered by including surface elements on the surface 114 at the connection region 129. As a result, the surface 114 of the second panel member 104, at the connecting region 129, will be a differential height surface, in that it will have an area of lower height and upper height.

In another embodiment, this is accomplished by providing extra material on the casting surface 114 at the connection region 129 so that, if the casting surface does crack, then the cracks do not reach to the rivet threshold.

In one embodiment, the differential height surface portion 300 (at the connection region 129) is thicker or higher than portions of the second panel member 104 that are immediately surrounding the connection region 129. In one embodiment, the differential height surface portion 300 may be higher than the region or portion that is outside the immediate connection region. The connection region may be higher or thicker than its surrounding regions. In other embodiments, there may be differential heights within the connection region. In one embodiment, the raised surface elements 302 of the differential height surface portion 300 may have differential heights (i.e., increasing, decreasing or a combination thereof) from base surface height of the second surface 114 of the second panel member 104.

In one embodiment, the differential height surface portion 300 is configured to aid during the deformation of the second or bottom panel member 104, at the connection region 129, by improving or enhancing flow of its material. That is, the differential height surface portion 300 is configured to enhance or improve the material flow of the second or bottom panel member 104, at the connection region 129, during the riveting procedure. Enhancing or improving the material flow of the second or bottom panel member 104 during the riveting procedure also prevents or reduces localized strain(s) on the self-piercing rivet button area 130.

In one embodiment, the differential height surface portion 300 is configured to provide extra or additional material over the area(s) of the surface 114 (i.e., at the connection region 129) that will be deformed by the riveting procedure. By arranging extra or additional material over these area(s) of the surface 114, the differential height surface portion 300 is configured to enable the second or bottom panel member 104 to protrude into the cavity 206 of the die 204 with no or reduced fracture, cracks or tears on the self-piercing rivet button area 130 of the second or bottom panel member 104. If a crack does occur in the button area 130, the distance between the crack and the self-piercing rivet 106 is still well within the acceptable limits to avoid any possible galvanic corrosion.

In one embodiment, the differential height surface portion 300 is configured to increase the surface area of the area(s) of the surface 114 (i.e., at the connection region 129) that will be deformed by the riveting procedure. In one embodiment, the differential height surface portion 300 is configured to reduce or relieve surface tension (and increase surface area) in these area(s) of the surface 114 to control the displacement of the material of the area(s) into the die cavity 206. This in turn mitigates or eliminates crack, tear or fracture formation on the second surface 114 of the second panel member 104 during the riveting procedure.

In one embodiment, the raised surface elements 302 of the differential height surface portion 300 are configured to allow for material to feed into the self-piercing rivet button area 130 during the riveting procedure and reduce the surface tension in order to relieve the radial cracking.

In one embodiment, during the riveting procedure, when the rivet 106 flares within the bottom or second panel member 104, the surface elements 302 on the differential height surface portion 300 stretch to provide enough slack, increased line of length or surplus material in the area(s) of the surface 114, at the connection region 129, that undergo deformation. That is, during the last stage of the riveting procedure when the bottom or second panel member 104 is deformed outwardly and downwardly by the rivet 106, the surface elements 302 stretch out until the area(s) of the surface 114, at the connection region 129, are substantially flat (i.e., without any surface textures). The surface elements 302, thus, are configured to provide a relief for the bottom or second panel member 104, at the connection region 129, so as to allow the bottom or second panel member 104 to freely stretch out (e.g., without developing cracks, tears, fractures), at the connection region 129, during the riveting procedure.

In one embodiment, the differential height surface portion 300 and the raised surface elements 302 thereon may be formed using a stamping procedure, a sand-blasting procedure, a grit-blasting procedure, a grinding procedure (with a grinding wheel), an Electro Discharge Texturing (EDT) procedure, a laser beam texturing procedure, an electron beam texturing (EBT) procedure, etc. In one embodiment, the differential height surface portion 300 and the raised surface elements 302 thereon may be formed during the casting procedure. For example, the raised surface elements 302 may be cut into the casting die and does not require any post casting procedure. In another embodiment, the raised surface elements 302 may be formed on the second surface 114 of the second panel member 104 at least at the connection region 129 during a post casting procedure (i.e., after the casting procedure).

In the embodiments of the present patent application, the assembly 100 is described to include the first and second panel members. However, in another embodiment, it is contemplated that the assembly 100 may include three or more panel members. In such an embodiment, the surface elements are formed on the bottom most panel member of the stacked panel member assembly.

In one embodiment, the raised surface elements 302 are selected from a group consisting of indentations or dimples (internal or external), knurls, linear ridges, raised (spiral or concentric) rings, etc. In one embodiment, the raised surface elements 302 may have the same shape and configuration. In another embodiment, the raised surface elements 302 may have different shapes and configurations. For example, in embodiment, the height, depth, and/or width of all the raised surface elements 302 may be the same. In another embodiment, the height, depth, and/or width of the raised surface elements 302 may vary. In one embodiment, the spacing and/or the pitch between the raised surface elements 302 may be the same. In another embodiment, the spacing and/or the pitch between the raised surface elements 302 may vary. In one embodiment, the raised surface elements 302 may be cast into the casting or panel member 104, for example, during a high pressure die casting procedure.

In one embodiment, referring to FIGS. 4A-9C, the surface 114 of the second or bottom panel member 104 may include a recessed surface 115 and the differential height surface portion 300 may be formed on the recessed surface 115 of the second panel member 104.

In one embodiment, as shown in FIGS. 4A-4C and 5A-5C, the differential height surface portion 300 may include surface indentations or dimples 402 or 502. In one embodiment, the surface indentations 402 or 502 may be selected from dimples, protrusions, projections, pits, bumps, dents, grooves, slits, channels, depressions and/or other surface irregularities.

In one embodiment, each of the surface indentations 402 or 502 may have a different shape, size or configuration. In one embodiment, each of the surface indentations 402 or 502 may have the same shape, size or configuration. In one embodiment, the surface indentations 402 or 502 may have generally circular shaped configurations as shown in their respective top elevational views in FIGS. 4C and 5C. In another embodiment, the surface indentations 402 or 502 may have generally elongated (e.g., oval or elliptical) shaped configurations. In yet another embodiment, the surface indentations 402 or 502 may generally have triangle, or other polygonal shaped configurations. In yet another embodiment, the surface indentations 402 or 502 may generally have symmetrical or asymmetrical shaped configurations.

In one embodiment, the depth or height of each of the surface indentations 402 or 502 may vary or may be the same. In one embodiment, the spacing between the surface indentations 402 or 502 may vary or may be the same. Referring to FIG. 4B, the surface indentations 402 are configured to protrude inwardly into the surface 114 of the panel member 104. The surface indentations 502 are configured to protrude outwardly away from the surface 114 of the panel member 104 as shown in FIG. 5B. In one embodiment, the amount of protrusion (into or away from the surface 114 of the panel member 104) may be predetermined.

In one embodiment, the surface indentations 402 or 502 may be randomly positioned on the second surface 114 of the second panel member 104 at least at the connection region 129. In one embodiment, the surface indentations 402 or 502 may be positioned in a predetermined pattern (e.g., repetitive pattern) on the second surface 114 of the second panel member 104 at least at the connection region 129. In one embodiment, the number of surface indentations 402 or 502 disposed on the differential height surface portion 300 may vary.

In one embodiment, the surface indentations 402 or 502 may be formed on the second surface 114 of the second panel member 104 at least at the connection region 129 during a post casting procedure (i.e., after the casting procedure). For example, the depressions may be formed on the surface 114 of the panel member 104, for example, during a post casting procedure. In one embodiment, the surface indentations 402 or 502 may be formed by a press or a punch. In another embodiment, the surface indentations 402 or 502 may be formed by any one of the procedures noted above to form the differential height surface portion 300. In another embodiment, the surface indentations 402 or 502 may be applied to the second surface 114 of the second panel member 104 during a casting procedure, for example, a high pressure die casting procedure. In another embodiment, the surface indentations 402 or 502 may be applied to the second surface 114, at least at the connection region 129, of the second panel member 104 by stamping, pressing or by any other suitable metal embossing procedure.

In one embodiment, referring to FIGS. 4A and 5A, the surface indentations 402 or 502 may be separated from each other by depressions 402A or 502A, respectively. In one embodiment, the depressions 402A or 502A may also be referred to as pits, grooves, cavities, recesses, or dents. In one embodiment, as shown in FIGS. 4A and 5A, the depressions 402A or 502A may generally have a height dimension, h. In one embodiment, the height dimension, h of the depressions 402A or 502A may generally range between 25 and 75% of the height dimension, H of the corresponding surface indentations 402 or 502.

In one embodiment, referring to FIGS. 6A-6C, the differential height surface portion 300 may include surface ridges or crests 602. In one embodiment, the surface ridges 602 may be linear ridges. In one embodiment, the surface ridges 602 may be angular ridges. In one embodiment, the surface ridges 602 may be parallel to each other. In one embodiment, the number of the surface ridges 602 disposed on the differential height surface portion 300 may vary.

In one embodiment, referring to FIG. 6A, the surface ridges 602 may be separated from each other by channels 602A. In one embodiment, the channels 602A may also be referred to as grooves or depressions (e.g., linear). In one embodiment, the channels 602A may generally have a height dimension, h (as shown in FIG. 6A). In one embodiment, the height dimension, h of the channels 602A may generally range between 25 and 75% of the height dimension, H of the corresponding surface ridges 602.

In one embodiment, the height of each of the surface ridges 602 may vary or may be the same. In one embodiment, the width of each of the surface ridges 602 may vary or may be the same along its length. In one embodiment, each of the surface ridges 602 may have a different shape, size or configuration. In one embodiment, each of the surface ridges 602 may have the same shape, size or configuration. In one embodiment, edges or corners of the surface ridges 602 may be beveled, chamfered, or rounded. In one embodiment, as shown in FIGS. 6A-6C, the surface ridges 602 have square shaped configuration. In another embodiment, the surface ridges 602 may have sinusoidal, trapezoidal, rectangular, triangular or sawtooth shaped configurations.

In one embodiment, as shown in FIGS. 6A-6C, the surface ridges 602 and their channels may be positioned in a regular pattern and uniformly spaced on the second surface 114, at least at the connection region 129, of the second panel member 104. In another embodiment, the surface ridges 602 and their channels may be positioned in an irregular pattern and are not uniformly spaced on the second surface 114, at least at the connection region 129, of the second panel member 104.

In the illustrated embodiment, the surface ridges 602 and their channels 602A extend in a direction as shown by an arrow X (as shown in FIG. 6C). In another embodiment, the surface ridges 602 and their channels 602A may run in any other direction. For example, in one embodiment, the surface ridges 602 and their channels 602A run in a direction perpendicular or transverse to the direction shown by the arrow X.

In one embodiment, the surface ridges 602 may be applied to the second surface 114, at least at the connection region 129, of the second panel member 104 during a post casting procedure (i.e., after the casting procedure). In one embodiment, the surface ridges 602 may be applied to the second surface 114, at least at the connection region 129, of the second panel member 104 during a casting procedure, for example, a high pressure die casting procedure. In another embodiment, the surface ridges 602 may be formed by any one of the procedures noted above to form the differential height surface portion 300. In another embodiment, the surface ridges 602 may be formed by using a press or a punch. In another embodiment, the surface ridges 602 may be applied to the second surface 114, at least at the connection region 129, of the second panel member 104 by stamping, pressing or by any other suitable metal embossing procedure.

In one embodiment, referring to FIGS. 7A-7C, the differential height surface portion 300 may include an extended flat depth surface profile. In one embodiment, the differential height surface portion 300 may include a surface 303 that extends a predetermined depth from the surface 114 of the panel member 104 and a predetermined length in a direction substantially parallel to the surface 114 of the panel member 104. In one embodiment, the surface 303 may have a generally flat configuration.

In one embodiment, the differential height surface portion 300 of FIG. 7A may be a region of additional thickness. The additional thickness region of FIG. 7A is configured to allow the self-piercing rivet button area 130 to crack normally but would increase the distance between the crack and the self-piercing rivet 106 to be within the acceptable limits to avoid any possible galvanic corrosion. In one embodiment, the additional thickness region of FIG. 7A may be cut into the casting die and be automatically cast with the rest of the part.

In one embodiment, referring to FIGS. 8A-8C, the differential height surface portion 300 may include surface knurls 802. In the illustrated embodiment, the differential height surface portion 300 includes diamond-pattern (or cross-hatched) knurls 802. In one embodiment, the surface knurls 802 may include angularly oriented, triangular shaped surface ridges that are intersecting each other ridges to form different polygonal or other geometric shaped configurations therebetween. It is appreciated that the differential height surface portion 300 may include straight-pattern knurls or diagonal-pattern knurls.

In one embodiment, referring to FIG. 8A, the surface knurls 802 may be separated from each other by channels 802A. In one embodiment, the channels 802A may also be referred to as grooves or depressions (e.g., linear). In one embodiment, the channels 802A may generally have a height dimension, h (as shown in FIG. 8A). In one embodiment, the height dimension, h of the channels 802A may generally range between 25 to 75% of the height dimension, H of the corresponding surface knurls 802.

In one embodiment, the surface knurls 802 may be applied to the second surface 114, at least at the connection region 129, of the second panel member 104 during a post casting procedure (i.e., after the casting procedure). In one embodiment, the surface knurls 802 may be applied to the second surface 114, at least at the connection region 129, of the second panel member 104 during a casting procedure, for example, a high pressure die casting procedure.

In one embodiment, the surface knurls 802 may be applied to the second surface 114, at least at the connection region 129, of the second panel member 104 by form/roll knurling procedure or cut knurling procedure. In one embodiment, the surface knurls 802 may be formed by a knurling tool that is configured to cut or roll a pattern of straight, angled or crossed lines onto the second surface 114, at least at the connection region 129, of the second panel member 104. In another embodiment, the surface knurls 802 may be applied to the second surface 114, at least at the connection region 129, of the second panel member 104 by stamping, pressing or by any other suitable metal embossing procedure. In one embodiment, the surface knurls 802 may be formed by using a press or a punch.

In one embodiment, the differential height surface portion 300 may include raised ring elements 902. In one embodiment, the differential height surface portion 300 may include concentric raised ring elements 902. In one embodiment, the differential height surface portion 300 may include spiral raised ring elements. In one embodiment, the raised ring elements 902 may be continuous (closed) or discontinuous (open). In one embodiment, the raised ring elements 902 may be generally circular, elliptical, square, triangular, polygonal or other shaped configurations.

In one embodiment, each of the raised ring elements 902 is separated from the other by a predetermined gap. In one embodiment, radial width of each gap may vary or may be the same.

In one embodiment, the raised ring elements 902 may be applied to the second surface 114, at least at the connection region 129, of the second panel member 104 during a post casting procedure (i.e., after the casting procedure). In one embodiment, the raised ring elements 902 may be applied to the second surface 114, at least at the connection region 129, of the second panel member 104 during a casting procedure, for example, a high pressure die casting procedure. In another embodiment, the raised ring elements 902 may be formed by any one of the procedures noted above to form the differential height surface portion 300. In one embodiment, the raised ring elements 902 may be formed by using a press or a punch. In another embodiment, the raised ring elements 902 may be applied to the second surface 114, at least at the connection region 129, of the second panel member 104 by stamping, pressing or by any other suitable metal embossing procedure.

The portions and dimensions of various parts of the exemplary riveted assembly as shown and described here are intended to be merely exemplary and not limiting in any way. The various parts of the exemplary riveted assembly are drawn to scale in accordance with one embodiment, although other scales and shapes may be used in other embodiments. The dimensions of various parts of the exemplary riveted assembly are measured in millimeters unless indicated otherwise. In one embodiment, the dimensions of various parts of the exemplary riveted assembly, as shown and described here, are up to 5 percent greater than or up to 5 percent less than those illustrated and described. In another embodiment, the dimensions of various parts of the exemplary riveted assembly, as shown and described here, are up to 10 percent greater than or up to 10 percent less than those illustrated and described. In yet another embodiment, the dimensions of various parts of the exemplary riveted assembly, as shown and described here, are up to 20 percent greater than or up to 20 percent less than those illustrated and described.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A riveted assembly comprising:
a first panel member made of a metal material and having a first surface and a second surface opposite to the first surface;
a second panel member made of a metal material and having a first surface and a second surface opposite to the first surface;
wherein the first and second panel members are positioned such that at least a portion of the second surface of the first panel member is in contact with at least a portion of the first surface of the second panel member; and
a rivet extending into and engaging the first surface of the first panel member, and extending into and contacting the metal material of the second panel member, the rivet having a head portion and an outwardly flared leg portion about which a portion of the first panel member and the second panel member are deformed, such that the rivet mechanically connects the first panel member to the second panel member at a connection region,
wherein the second surface of the second panel member has a differential height surface portion at least at the connection region,
wherein the second panel member including the differential height surface portion has substantially the same metal material composition throughout its thickness,
wherein the differential height surface portion includes a greater amount of metal material per unit area in the connection region in comparison with portions of the second panel member immediately surrounding the differential height surface portion,
wherein the differential height surface portion, disposed at the connection region, includes an undulating cross-sectional pattern on an outwardly facing surface thereof, and
wherein the undulating cross-sectional pattern on the outwardly facing surface of the differential height surface portion of the second panel member and the differential height surface portion of the second panel member provide a material feed region to enhance flow of the metal material in the connection region to resist cracking of the metal material of the second panel member.

2. The assembly of claim 1, wherein the undulating cross-sectional pattern of the differential height surface portion extends above a base surface height of the second surface of the second panel member, and wherein the undulating cross-sectional pattern of the differential height surface portion is at least 0.2 millimeters higher than the base surface height of the second surface of the second panel member.

3. The assembly of claim 2, wherein the undulating cross-sectional pattern of the differential height surface portion includes a regular pattern.

4. The assembly of claim 2, wherein the undulating cross-sectional pattern of the differential height surface portion comprises linear ridges.

5. The assembly of claim 2, wherein the undulating cross-sectional pattern of the differential height surface portion comprises indentations.

6. The assembly of claim 2, wherein the raised surface elements are cast formed onto the second surface of the second panel member.

7. The assembly of claim 2, wherein the undulating cross-sectional pattern of the differential height surface portion extends in the range between 0.2 and 1.5 millimeters above the base surface height of the second surface of the second panel member.

8. The assembly of claim 2, wherein the differential height surface portion and the raised surface elements thereon are formed using a stamping procedure, a sand-blasting procedure, a grit-blasting procedure, a grinding procedure with a grinding wheel, an Electro Discharge Texturing (EDT) procedure, a laser beam texturing procedure, an electron beam texturing (EBT) procedure, or a casting procedure.

9. The assembly of claim 1, wherein the undulating cross-sectional pattern of the differential height surface portion comprises indentations, dimples, knurls, ridges, or raised concentric rings.

10. The assembly of claim 1, wherein the undulating cross-sectional pattern of the differential height surface portion includes an additional thickness region.

11. The assembly of claim 1, wherein the rivet is a self-piercing rivet.

12. The assembly of claim 1, wherein the differential height surface portion is thicker or higher than the portions of the second panel member immediately surrounding the connection region.

13. The assembly of claim 1, wherein the differential height surface portion has differential heights within the connection region.

14. The assembly of claim 1, wherein the metal material is selected from the group consisting of steel, stainless steel, hi-strength steel, Dual-phase steel sheet, DP600 steel sheet, aluminum, aluminum sheet, aluminum castings, coated steel, galvanized steel, uncoated steel, coated aluminum, galvanized aluminum, uncoated aluminum, steel alloys, boron steel, hot stamped steel, and aluminum alloys.

15. The assembly of claim 14, wherein the metal material is an aluminum material.

16. The assembly of claim 1, wherein the material feed region of the differential height surface portion of the second panel member is configured to deform as the rivet extends into the metal material of the second panel member so as to enhance the flow of the metal material in the connection region to resist cracking of the metal material of the second panel member.

\* \* \* \* \*